United States Patent
Mawby

(10) Patent No.: US 10,260,993 B2
(45) Date of Patent: Apr. 16, 2019

(54) TIRE UNIFORMITY IMPROVEMENT THROUGH IDENTIFICATION OF A COMPOSITE UNIFORMITY PARAMETER USING WEIBULL DISTRIBUTIONS

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH); William David Mawby, Greenville, SC (US)

(72) Inventor: William David Mawby, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 153 days.

(21) Appl. No.: 15/500,173

(22) PCT Filed: Jul. 31, 2014

(86) PCT No.: PCT/US2014/049170
§ 371 (c)(1),
(2) Date: Jan. 30, 2017

(87) PCT Pub. No.: WO2016/018371
PCT Pub. Date: Feb. 4, 2016

(65) Prior Publication Data
US 2017/0241867 A1  Aug. 24, 2017

(51) Int. Cl.
*B29D 30/00* (2006.01)
*B29D 30/06* (2006.01)
*G01M 17/02* (2006.01)

(52) U.S. Cl.
CPC ......... *G01M 17/02* (2013.01); *B29D 30/0061* (2013.01); *B29D 30/0633* (2013.01);
(Continued)

(58) Field of Classification Search
CPC .................................................... G01M 17/02
See application file for complete search history.

(56) References Cited

U.S. PATENT DOCUMENTS

| 4,458,451 A | 7/1984 | Rogers |
| 6,405,146 B1 | 6/2002 | Engel |

(Continued)

FOREIGN PATENT DOCUMENTS

| EP | 1134573 | 9/2001 |
| EP | 2626684 | 8/2013 |

(Continued)

OTHER PUBLICATIONS

PCT International Search Report for corresponding PCT Application No. PCT/US2014/049151, dated Dec. 5, 2014—2 pages.
(Continued)

*Primary Examiner* — Manuel L Barbee
*Assistant Examiner* — Raymond L Nimox
(74) *Attorney, Agent, or Firm* — Dority & Manning, P.A.

(57) ABSTRACT

Methods and systems for improving the uniformity of a tire are provided. More specifically, one or more characteristics of a composite uniformity parameter can be determined from harmonic magnitudes associated with a plurality of harmonics of the composite uniformity parameter. For instance, a range of a composite uniformity parameter and/or a distribution of amplitudes of a composite uniformity parameter for a set of tires can be determined from harmonic magnitudes associated with selected harmonics of the composite uniformity parameter. According to example aspects of the present disclosure, the one or more characteristics of the composite uniformity parameter can be determined using Weibull distributions of the harmonic magnitudes. Once identified, the one or more characteristics can be used to modify tire manufacture to improve tire uniformity.

14 Claims, 6 Drawing Sheets

(52) U.S. Cl.
CPC ............... *B29D 2030/0066* (2013.01); *B29D 2030/0635* (2013.01)

(56) References Cited

U.S. PATENT DOCUMENTS

| | | | |
|---|---|---|---|
| 6,496,834 | B1 | 12/2002 | Cereghini et al. |
| 2003/0112234 | A1 | 6/2003 | Brown et al. |
| 2005/0081614 | A1 | 4/2005 | Zhu |
| 2006/0031024 | A1 | 2/2006 | Mountassir |
| 2012/0031179 | A1* | 2/2012 | Mawby ............. B29D 30/0061 73/146 |
| 2012/0035757 | A1* | 2/2012 | Mawby ............. B29D 30/0633 700/104 |
| 2012/0095587 | A1* | 4/2012 | Hair, Jr. ............. G01M 17/024 700/110 |
| 2013/0090879 | A1* | 4/2013 | Estor ................. G01M 17/02 702/97 |
| 2013/0098148 | A1* | 4/2013 | Mawby ............. G01M 17/02 73/146 |
| 2013/0253686 | A1* | 9/2013 | Flament ............. G01M 17/02 700/117 |
| 2014/0350879 | A1* | 11/2014 | Takiguchi ........... G01R 29/12 702/70 |
| 2015/0300921 | A1 | 10/2015 | Nicholson et al. |

FOREIGN PATENT DOCUMENTS

| | | |
|---|---|---|
| EP | 2745224 | 6/2014 |
| JP | H10/281913 | 10/1998 |
| JP | 2000/234980 | 8/2000 |
| JP | 2005/186790 | 7/2005 |
| JP | 2006/105775 | 4/2006 |
| JP | 2013/210355 | 10/2013 |
| WO | WO 02/099377 | 12/2002 |
| WO | WO 2013/099984 | 4/2013 |
| WO | WO 2014/092722 | 6/2014 |

OTHER PUBLICATIONS

PCT International Search Report for corresponding PCT Application No. PCT/US2014/049165, dated Nov. 19, 2014—2 pages.
PCT International Search Report for corresponding PCT Application No. PCT/US2014/049170, dated Dec. 5, 2014—2 pages.
PCT International Search Report for corresponding PCT Application No. PCT/US2014/049174, dated Dec. 5, 2014—2 pages.
Friendly et al., "Elliptical Insights: Understanding Statistical Methods through Elliptical Geometry," *Statistical Science*, vol. 28, No. 1, Feb. 2013, pp. 1-40.
Nolan, "Multivariate elliptically contoured stable distributions: theory and estimation," American University, Oct. 31, 2006—17 pages.
Sibley, "Weibull Analysis as a Tool for Yield Analysis and Control Charting," M.A. Sibley Consulting, Feb. 24, 2013—38 pages.
Tentzerakis et al., "Evaluation of Wind Farm Harmonic Current Emissions," European Wind Energy Conference & Exhibition Conference, May 7-10, 2007, Milan, Italy—9 pages.
Boudt et al., "Robust and Explicit Estimators for Weibull Parameters," *Metrika*, vol. 73, Issue. 2, Mar. 2011—27 pages.

* cited by examiner

TIRE UNIFORMITY IMPROVEMENT THROUGH IDENTIFICATION OF A COMPOSITE UNIFORMITY PARAMETER USING WEIBULL DISTRIBUTIONS

FIELD

The present disclosure relates to tire uniformity and more particularly to improving tire uniformity by identification of one or more characteristics of a composite uniformity parameter from harmonic magnitudes using Weibull distributions.

BACKGROUND

Tire non-uniformity relates to the symmetry (or lack of symmetry) relative to the tire's axis of revolution in certain quantifiable characteristics of a tire. Conventional tire building methods unfortunately have many opportunities for producing non-uniformities in tires. During revolution of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

A tire uniformity waveform can be composed of a large number of harmonics, such as a first harmonic, second harmonic, third harmonic, etc. The individual harmonics can be obtained using Fourier decomposition of the uniformity waveform. The individual harmonics of a uniformity waveform can have a harmonic magnitude. The harmonic magnitude can be the difference between the maximum and minimum uniformity value for the harmonic.

SUMMARY

Aspects and advantages of embodiments of the present disclosure will be set forth in part in the following description, or may be learned from the description, or may be learned through practice of the embodiments.

One example aspect of the present disclosure is directed to a method for improving the uniformity of a tire. The method includes obtaining, by one or more computing devices, uniformity data associated with a set of a plurality of tires. The uniformity data includes one or more sets of harmonic magnitudes for one or more selected harmonics of a uniformity parameter for the set of tires. The method further includes identifying, by the one or more computing devices, one or more parameters of a Weibull distribution for each of the one or more sets of harmonic magnitudes. The method further includes identifying, by the one or more computing devices, one or more characteristics of the composite uniformity parameter for the set of tires based at least in part on the one or more parameters of the Weibull distribution for each of the one or more sets of harmonic magnitudes and modifying tire manufacture based at least in part on the one or more characteristics of the composite uniformity parameter.

Another example aspect of the present disclosure is directed to a system for improving the uniformity of a tire. The system includes one or more processors and one or more memory devices. The one or more memory devices can store computer-readable instructions that when executed cause the one or more processors to perform operations. The operations can include one or more aspects of any of the methods disclosed herein.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
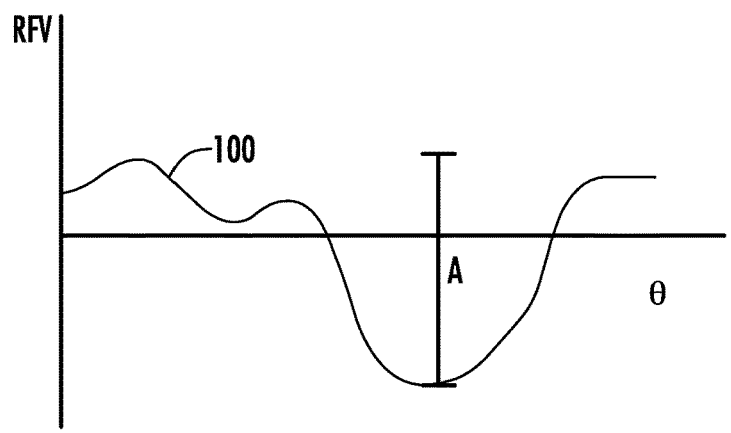
FIG. 1 depicts an example composite uniformity waveform.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to methods and systems for improving the uniformity of a tire. More specifically, one or more characteristics of a composite uniformity parameter can be determined from harmonic magnitudes associated with a plurality of harmonics of the composite uniformity parameter. For instance, a range of a composite uniformity parameter and/or a distribution of amplitudes of a composite uniformity parameter for a set of tires can be determined from harmonic magnitudes associated with selected harmonics of the composite uniformity parameter. According to example aspects of the present disclosure, the one or more characteristics of the composite uniformity parameter can be determined using Weibull distributions of the harmonic magnitudes. Once identified, the one or more characteristics can be used to modify tire manufacture to improve tire uniformity.

More particularly, uniformity data can be collected for one or more tires by performing a plurality of uniformity measurements of a composite uniformity parameter at discrete data points for one or more revolutions of each tire. The uniformity data can be analyzed and used to sort or grade tires during tire manufacture. Tires that do not satisfy certain uniformity criteria can be subjected to a uniformity correction process to improve the uniformity of a tire.

Examples of composite uniformity parameters can include but are not limited to one or more of the following: radial run out, lateral run out, mass variance, balance, radial force variation, lateral force variation, and tangential force variation. The plurality of uniformity measurements performed at the discrete data points can be collectively represented as a composite uniformity waveform. FIG. 1 depicts an example composite uniformity waveform 100 of radial force variation for an example tire. FIG. 1 plots tire azimuth along the abscissa and the magnitude of the uniformity measurement along the ordinate.

Figure 2:
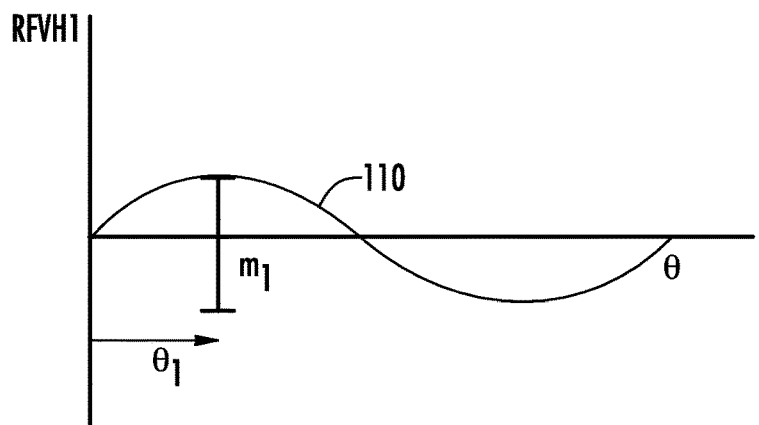
FIG. 2 depicts an example first harmonic of the composite uniformity waveform.
Figure 3:
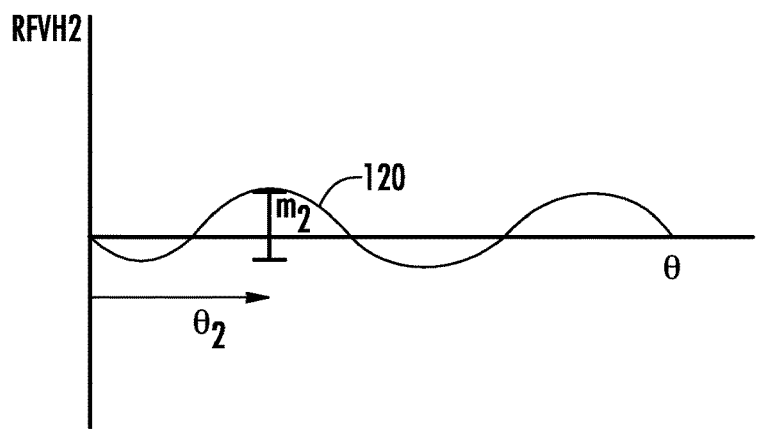
FIG. 3 depicts an example second harmonic of the composite uniformity waveform.

Composite uniformity data (e.g. a composite uniformity waveform) measured for a tire can comprise a large number of combined harmonics. The individual harmonics may be obtained by applying Fourier decomposition to the composite data. For instance, the composite radial force variation waveform 100 for a tire can be broken down into a first harmonic, second harmonic, third harmonic, fourth harmonic, etc., using Fourier decomposition. FIG. 2 depicts an example first harmonic 110 of the radial force variation waveform 100 of FIG. 1. FIG. 2 plots tire azimuth along the abscissa and magnitude of the first harmonic of radial force variation along the ordinate. FIG. 3 depicts an example second harmonic 120 of the radial force variation waveform 100 of FIG. 1. FIG. 3 plots tire azimuth along the abscissa and magnitude of the second harmonic of radial force variation along the ordinate.

In many cases, uniformity measurements are represented as uniformity summary data for one or more selected harmonics of the composite uniformity parameter, such as the first harmonic of radial force variation. The uniformity summary data can include a magnitude of one or more harmonics as well as a phase angle or azimuth of the harmonic. The magnitude of the harmonic can be the difference between the maximum and minimum uniformity measurement associated with the harmonic. The phase angle or azimuth of the first harmonic is defined as the angular offset between the reference location for the measurement and the location of maximum uniformity measurement. For example, referring to FIG. 2, the first harmonic 110 has a magnitude $m_1$ and a phase angle $\theta_1$. In FIG. 3, the second harmonic 120 has a magnitude $m_2$ and a phase angle $\theta_2$.

In certain cases, however, the phase angle of one or more harmonics may not be available or is otherwise desired not to be used. For instance, determination of the phase angle may require that a barcode or other indicator is attached to the tire during its manufacture to act as a reference point for measurement of the uniformity waveform. If this capability is absent from the manufacturing equipment, then the phase angle cannot be determined. In other instances, the phase angle may never have been computed or stored in a memory for future use.

According to example aspects of the present disclosure, properties of Weibull distributions can be used to estimate one or more characteristics associated with a composite uniformity parameter from the harmonic magnitudes (without phase angle information) for one or more harmonics associated with the composite uniformity parameter. For instance, parameters associated with one or more Weibull distributions can be determined from the harmonic magnitudes for each of the one or more harmonics of the composite uniformity parameter. Characteristics of the composite uniformity parameter can then be determined based at least in part on the one or more Weibull distributions.

As an example, uniformity data associated with a set of a plurality of tires can be obtained. The uniformity data can include sets of harmonic magnitudes for one or more selected harmonics of a uniformity parameter for the set of tires. For instance, the uniformity data can include a first set of harmonic magnitudes associated with a first selected harmonic of a uniformity parameter (e.g. the first harmonic) and a second set of harmonic magnitudes associated with a second selected harmonic (e.g. the second harmonic). The uniformity data can include other sets of harmonic magnitudes for other different harmonics. For instance, in one implementation, the uniformity data can include sets of harmonic magnitudes for each of the first four harmonics of the uniformity parameter.

The sets of harmonic magnitudes can each be associated with a Weibull distribution. A Weibull distribution is a probability distribution that can have various parameters, including a shape parameter and a scale parameter. The shape parameter can be indicative of the shape of the Weibull distribution while the scale parameter can be indicative of the extent of the Weibull distribution. Aspects of the present disclosure will be discussed with reference to Weibull distributions for purposes of illustration and discussion. Those of ordinary skill in the art, using the disclosures provided herein, will understand that other probability distributions can be used without deviating from the scope of the present disclosure.

In certain example implementations, a range of the composite uniformity parameter can be estimated based on an expected progression of the scale parameters of Weibull distributions across the plurality of harmonics. More particularly, a geometric progression parameter indicative of the expected progression can be used in conjunction with a scale parameter of, for instance, the Weibull distribution associated with harmonic magnitudes for the first harmonic of the uniformity parameter to estimate the range of the composite uniformity parameter.

According to other example aspects of the present disclosure, one or more characteristics of the composite uniformity parameter can be identified by estimating one or more parameters of a composite Weibull distribution. One or more characteristics of the composite uniformity parameter can then be determined based at least in part on the composite Weibull distribution.

For instance, one or more parameters of the composite Weibull distribution can be estimated based at least in part by summing the Weibull distributions associated with each of the sets of harmonic magnitudes for a plurality of harmonics of the composite uniformity parameter. Although the sum of a plurality of Weibull distributions is not an exact Weibull distribution, a composite Weibull distribution can be approximated as a sum of the plurality of Weibull distributions. Alternate methods such using a cupola fit for the sum are possible as well. One or more parameters of the composite Weibull distribution can be estimated by fitting a Weibull distribution to the sum of Weibull distributions (e.g. using a regression analysis). One or more characteristics associated with the composite uniformity parameter can then be determined from the composite Weibull distribution.

For instance, a distribution of amplitudes of the composite uniformity parameter for the set of tires can be determined based on the composite Weibull distribution. The distribution of amplitudes can have a direct impact on tire sorting and performance of the tire. According to aspects of the present disclosure, the distribution of amplitudes can be determined numerically from a distribution function based at least in part on the composite Weibull distribution.

Tire manufacture can be modified to improve tire uniformity based at least in part on the one or more characteristics identified for the composite uniformity parameter. For example, a range of the composite uniformity parameter can be monitored for different sets of tires during the tire manufacturing process. If the range deviates beyond acceptable thresholds, this can trigger the need for a maintenance event or an adjustment to the tire manufacturing process to reduce the range of the composite uniformity parameter to within acceptable thresholds. For instance, the rotation of tires relative to certain process elements used during tire manufacture can be adjusted to reduce the range of the composite uniformity parameter. As another example, the distribution of amplitudes of the composite uniformity parameter for the set of tires can be used to predict uniformity yield. Sorting limits can be set for uniformity correction and/or grading to adjust uniformity yield to within desired levels based on the distribution of amplitudes.

Example Methods for Improving the Uniformity of a Tire

Figure 4:
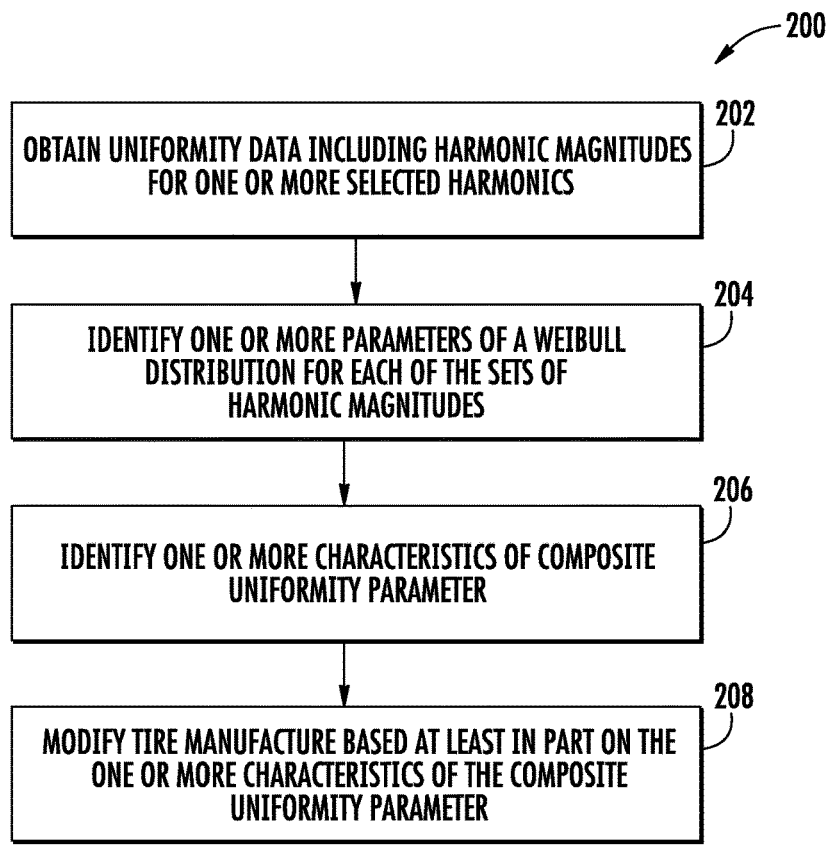
FIG. 4 depicts a flow diagram of an example method for improving tire uniformity according to example aspects of the present disclosure.

FIG. 4 depicts a flow diagram of an example method (200) for improving tire uniformity according to example aspects of the present disclosure. Aspects of the method (200) can be implemented by one or more computing devices, such as one or more of the computing devices depicted in FIG. 8. In addition, FIG. 4 depicts steps performed in a particular order for purposes of illustration and discussion. Those of ordinary skill in the art, using the disclosures provided herein, should understand that the steps of any of the methods disclosed herein can be rearranged, adapted, modified, omitted, or expanded in various ways without deviating from the scope of the present disclosure.

At (202), the method includes obtaining uniformity data of a uniformity parameter for a set of a plurality of tires. The uniformity parameter can correspond to any suitable uniformity parameter. For instance, the uniformity parameter can correspond to such uniformity parameters as radial run out, lateral run out, mass variance, balance, radial force variation, lateral force variation, and tangential force variation.

The uniformity data can include sets of harmonic magnitudes for one or more selected harmonics of the uniformity parameter. Each set of harmonic magnitudes can be associated with a different harmonic of the uniformity parameter. For instance, the uniformity data can include a first set of harmonic magnitudes associated with a first selected harmonic (e.g. the first harmonic, second harmonic, third harmonic, fourth harmonic, etc.) of a uniformity parameter. Each harmonic magnitude in the first set can be associated with a different tire in the set of tires. In addition, the uniformity data can include a second set of harmonic magnitudes associated with a second selected harmonic (e.g. the first harmonic, second harmonic, third harmonic, fourth harmonic etc.) of the uniformity parameter. Each harmonic magnitude in the second set can be associated with a different tire in the set of tires.

The uniformity data can be previously derived from uniformity measurements and stored in one or more memory devices. Obtaining the uniformity data can include accessing the uniformity data stored in the memory. In another embodiment, obtaining the uniformity data can include determining the uniformity data in conjunction with measuring the uniformity parameters with a uniformity measurement machine.

At (204), the method includes identifying one or more parameters of a Weibull distribution for each of the sets of harmonic magnitudes. For instance, a shape parameter, a scale parameter, and/or a shift parameter can be determined for the Weibull distributions. In particular implementations, the determination of the parameters can be simplified by setting the shift parameter to 0.0 and the shape parameter to 2.0. The scale parameter will tend to vary across the plurality of harmonics.

In one example, the scale parameter of the Weibull distribution associated with the harmonic magnitudes for a first harmonic of the uniformity parameter can be equal to an average amplitude of the first harmonic of the uniformity parameter for the set of tires. In many manufacturing situations, the relative sizes of the scale parameters should decrease in geometric progression across the plurality of harmonics according to a geometric progression parameter. More particularly, one would expect the scale parameter of the Weibull distribution associated with the set of harmonic magnitudes for the second harmonic to be equal to the geometric progression parameter times the scale parameter of the Weibull distribution associated with the set of harmonic magnitudes for the first harmonic. The scale parameter of the Weibull distribution associated with the set of harmonic magnitudes for the third harmonic can be equal to the geometric progression parameter squared times the scale parameter of the Weibull distribution associated with the set of harmonic magnitudes for the third harmonic. The scale parameter of the Weibull distribution associated with the set of harmonic magnitudes for the fourth harmonic can be equal to the geometric progression parameter cubed times the scale parameter of the Weibull distribution associated with the set of harmonic magnitudes for the fourth harmonic, and so forth.

The value of the geometric progression parameter can be determined empirically from uniformity data collected for a plurality of tires. In one implementation, the geometric progression parameter can be about 0.52, which has been found to fit example industrial harmonic patterns. The use of the term "about" in conjunction with a value can refer to within about 25% of the stated value.

At (206), the method can include identifying one or more characteristics of the composite uniformity parameter for the set of tires based at least in part on the one or more parameters of the Weibull distribution for each of the one or more sets of harmonic magnitudes. The one or more characteristics can include, for instance, a range of the composite uniformity parameter for the set of tires and/or a distribution of amplitudes of the composite uniformity parameter for the set of tires.

Figure 5:
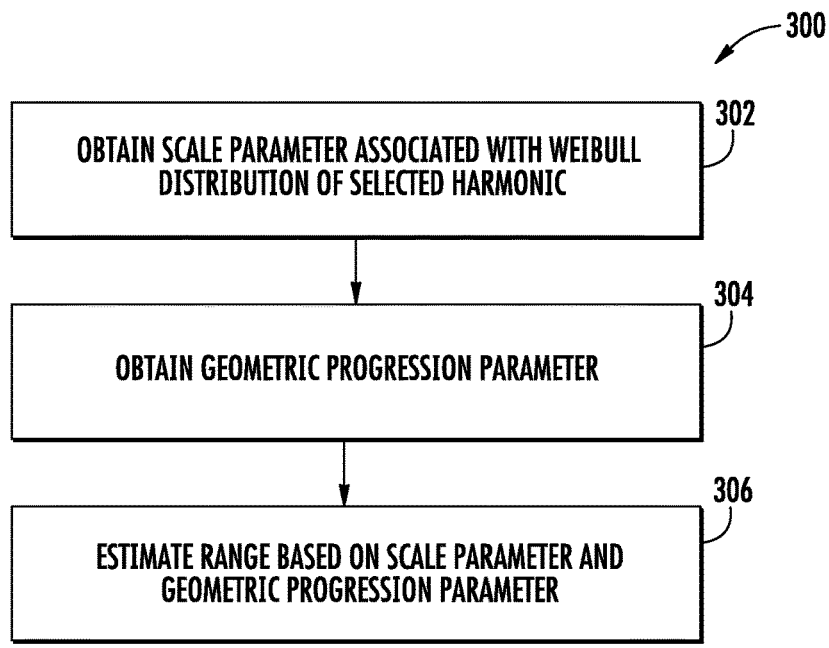
FIG. 5 depicts a flow diagram of an example method for identifying one or more characteristics of a composite uniformity parameter according to example aspects of the present disclosure.

FIG. 5 depicts a flow diagram of one example method for identifying a range of the composite uniformity parameter based at least in part on the one or more parameters of the Weibull distribution of each of the one or more sets of harmonic magnitudes according to example aspects of the present disclosure. At (302), a scale parameter associated with a Weibull distribution of harmonic magnitudes of a selected harmonic, such as the first harmonic, is obtained. The scale parameter can be equal to the average amplitude of the selected for the set of tires. At (304), a geometric progression parameter associated with the progression of scale parameters for Weibull distributions associated with a plurality of different harmonics of the uniformity parameter is obtained. As discussed above, the geometric progression parameter can be determined from empirical studies of uniformity data associated with one or more sets of tires. The geometric progression parameter can be, for instance, 0.56.

At (306) a range of the composite uniformity parameter can be determined from the scale parameter and the geometric progression parameter. More particularly, the range can be determined based on a geometrically weighted sum of the scale parameter according to the following:

$$CC = A_1 \cdot \sum_{i=1}^{N/2} q^{i-1}$$

where CC is the range of the composite uniformity parameter $A_1$ is the scale parameter for the Weibull distribution of harmonic magnitudes associated with the first harmonic and q is the geometric progression parameter. In example implementations, the sum of geometric weights based on the geometric progression parameter can resolve to a fixed value, such as 2.08. The range of the composite uniformity parameter can be determined by multiplying the fixed value times the scale parameter of the Weibull distribution of harmonic magnitudes associated with the first harmonic.

Figure 6:
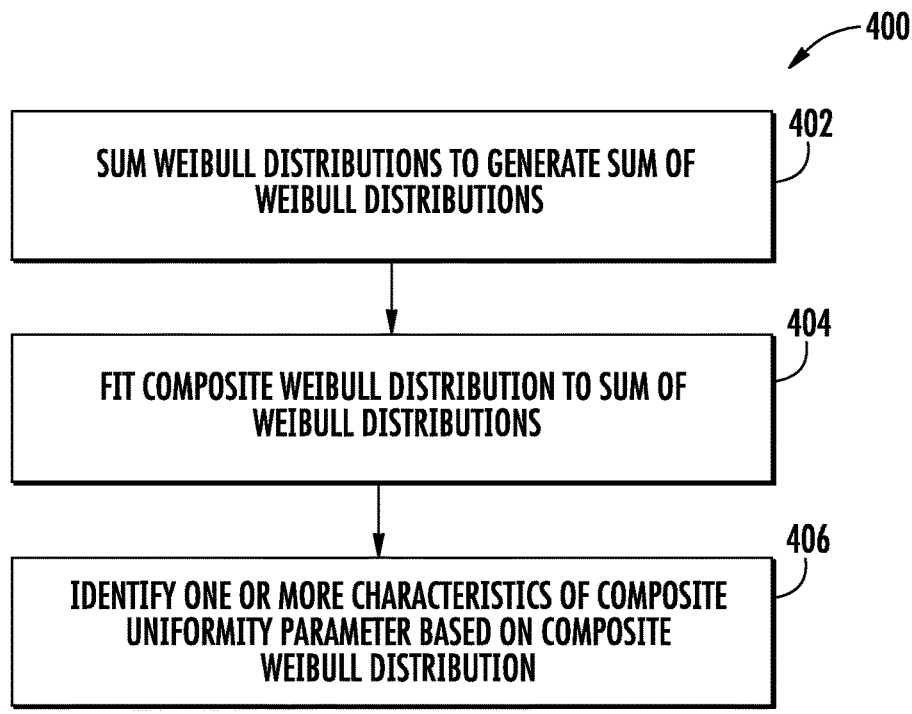
FIG. 6 depicts a flow diagram of an example method for identifying one or more characteristics of a composite uniformity parameter according to example aspects of the present disclosure.

FIG. 6 depicts a flow diagram of another example method (320) for identifying one or more characteristics of a composite uniformity parameter based at least in part on the one or more parameters of the Weibull distribution of each of the one or more sets of harmonic magnitudes according to example aspects of the present disclosure. At (322), the method includes summing the Weibull distributions to generate a sum of Weibull distributions. The sum of Weibull distributions may not be an exact Weibull distribution, but can be approximated as a Weibull distribution.

At (324), the method includes fitting a composite Weibull distribution to the sum of Weibull distributions. More particularly, one or more parameters of the composite Weibull distribution (e.g. the scale parameter) can be estimated by fitting a Weibull distribution to the sum of Weibull distributions. The composite Weibull distribution can be fitted to the sum of Weibull distributions using, for instance, a regression analysis.

At (326), the method can include identifying one or more characteristics of the composite uniformity parameter based at least in part on the composite Weibull distribution. For instance, in one implementation, the average amplitude of the composite uniformity parameter can be determined based at least in part on the scale parameter of the composite Weibull distribution.

In one particular aspect of the present disclosure, a distribution of amplitudes of the composite uniformity parameter can be determined from the composite Weibull distribution. Statistically, a distribution of amplitudes of a given random variable taken from a distribution F (such as the composite Weibull distribution) can be provided by the following formula where t stands for the half-amplitude and r stands for the amplitude:

$$f_{R,T}(r, t) = n(n-1)[F(t+r/2) - F(t-r/2)]^{n-2} f(t-r/2) f(t+r/2)$$

$$f_R(r) = \int_{-\infty}^{\infty} f_{R,T}(r, t) \cdot dt$$

The distribution function F for a Weibull distribution is as follows:

$$F(x) = 1 - \exp\left(-\left(\frac{x}{\alpha}\right)^\beta\right)$$

where $\alpha$ is the scale parameter of the composite Weibull distribution and $\beta$ is the shape parameter of the composite Weibull distribution. Substitution of the distribution function F for a Weibull distribution into the function defining the distribution of amplitudes can be performed numerically to derive the distribution of amplitudes.

Referring back to FIG. 4 at (208), the method includes modifying tire manufacture based at least in part on the one or more characteristics of the composite uniformity parameter. For example, the range of the composite uniformity parameter can be monitored for different sets of tires during the tire manufacturing process based on the one or more characteristics of the composite uniformity parameter. If the range deviates beyond acceptable thresholds, this can trigger the need for a maintenance event or an adjustment to the tire manufacturing process to reduce the range of the composite uniformity parameter to within acceptable threshold. For instance, the rotation of tires relative to certain process elements used during tire manufacture can be adjusted to reduce the range of the composite uniformity parameter.

As another example, the distribution of amplitudes of the composite uniformity parameter for the set of tires can be used to predict uniformity yield. Sorting limits can be set for uniformity correction and/or grading to adjust uniformity yield to within desired levels based on the distribution of amplitudes.

Figure 7:
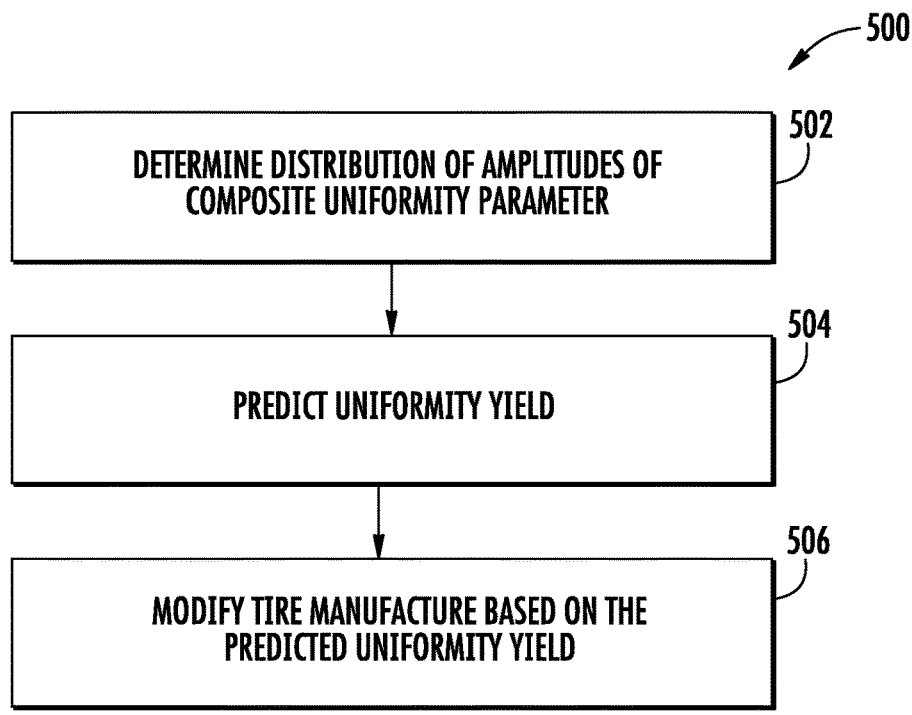
FIG. 7 depicts a flow diagram of an example method for modifying tire manufacture to improve tire uniformity according to example aspects of the present disclosure.

FIG. 7 depicts a flow diagram of an example method (500) for modifying tire manufacture according to example embodiments of the present disclosure. At (502), one or more characteristics of the composite uniformity parameter indicative of a distribution of amplitudes of the composite uniformity parameter for the set of tires can be accessed. At (504), uniformity yield is predicted for one or more thresholds based at least in part on the predicted uniformity yield. For instance, the number of tires that exceed a threshold can be estimated based on the distribution of amplitudes and used to predict uniformity yield. At (506), tire manufacture can be modified based on the predicted uniformity yield. For instance, the thresholds can be adjusted to obtain a desired uniformity yield for the set of tires.

Example Systems for Improving Tire Uniformity

Figure 8:
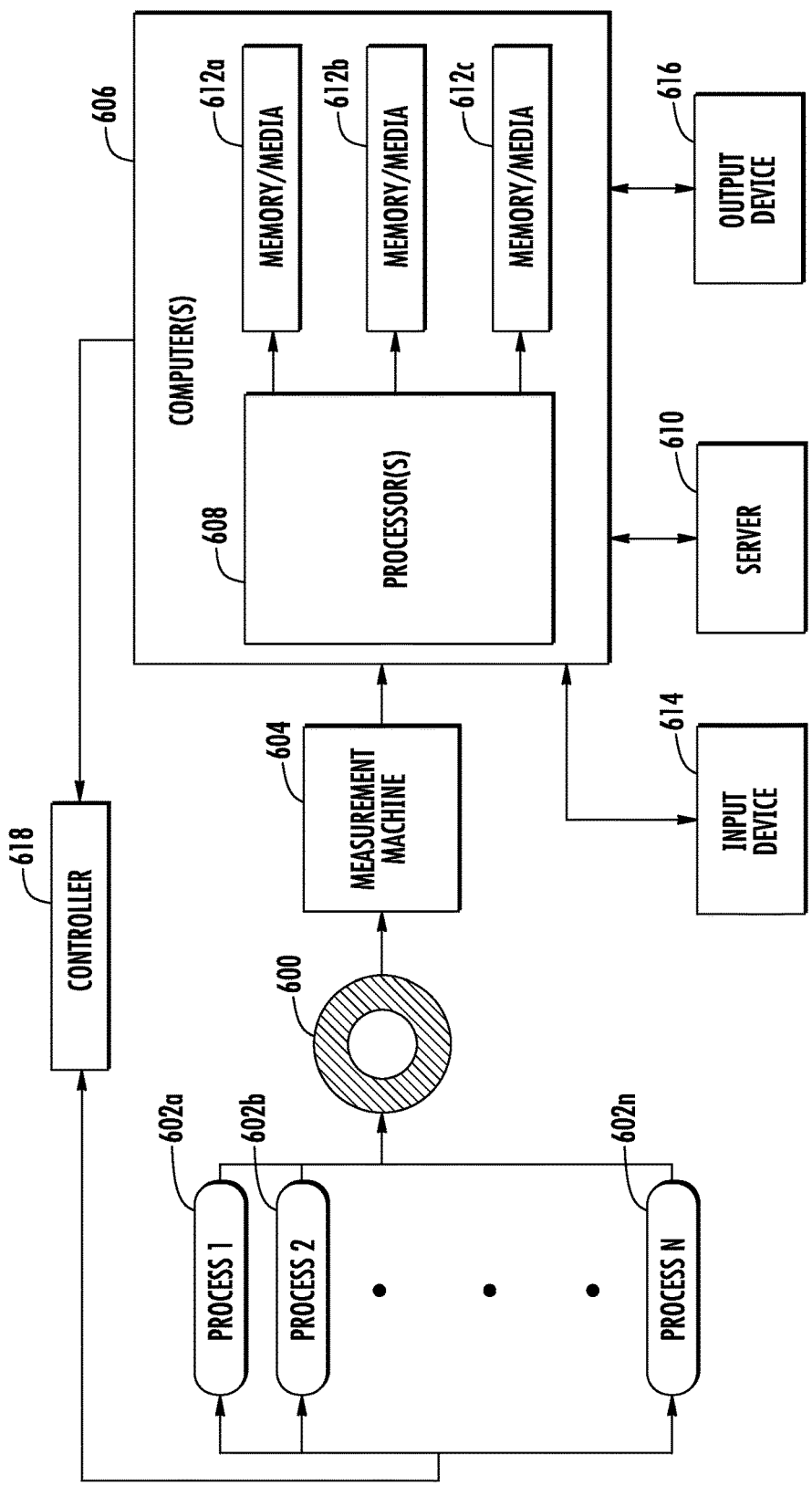
FIG. 8 depicts an example system for improving tire uniformity according to example aspects of the present disclosure.
Figure 9:
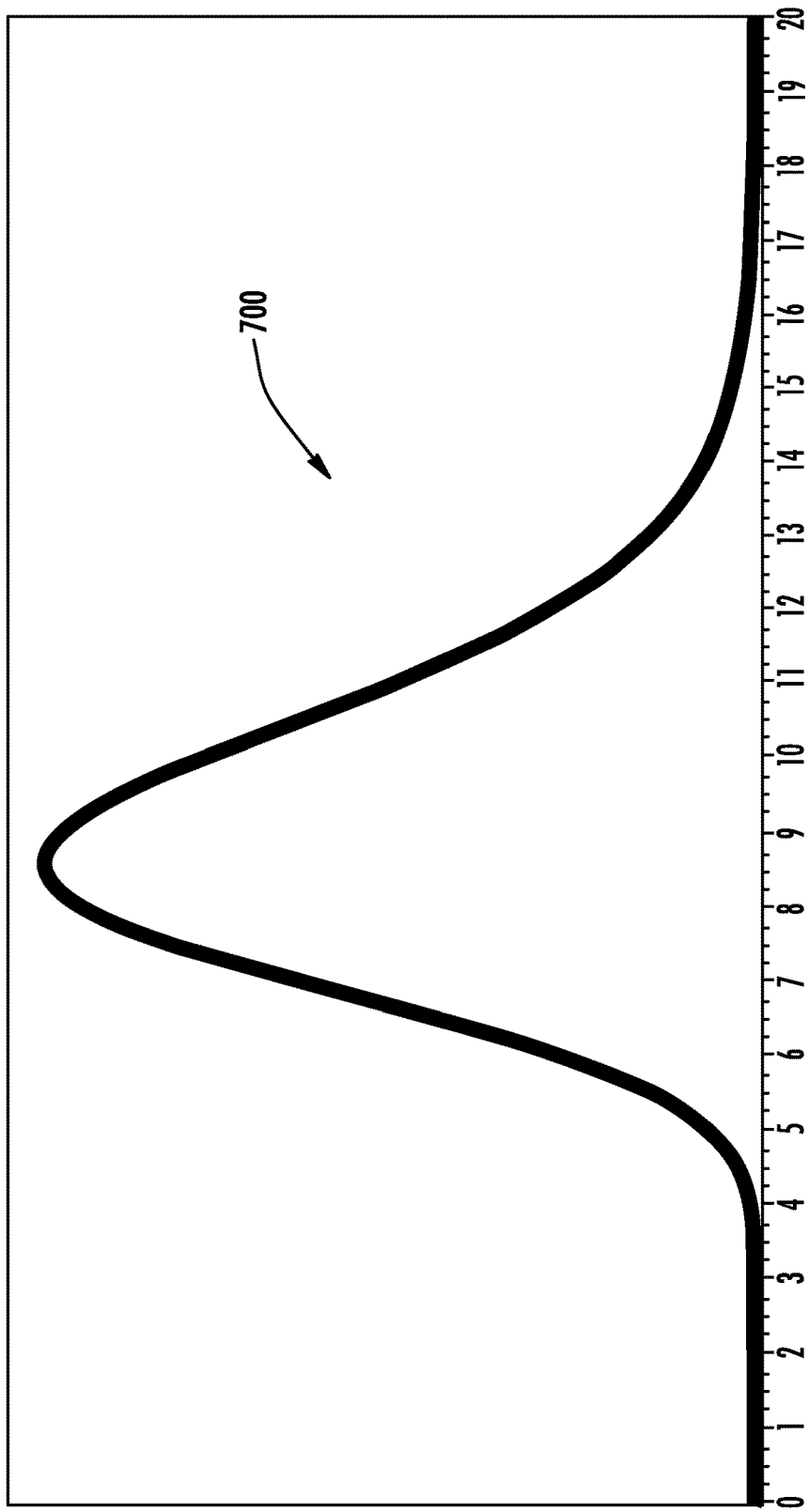
FIG. 9 depicts an example distribution of amplitudes of a composite uniformity parameter determined according to example aspects of the present disclosure.
Figure 10:
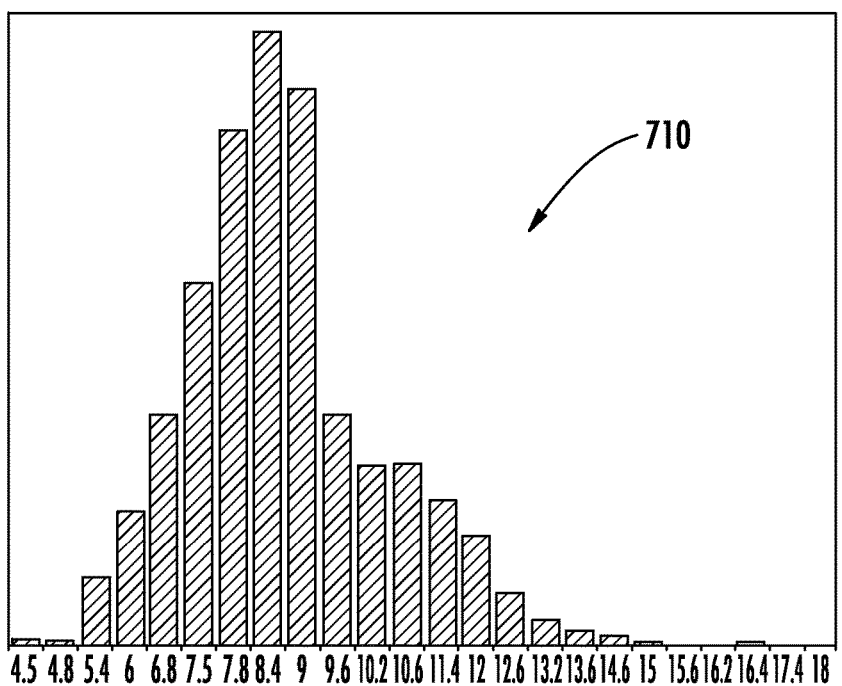
FIG. 10 depicts a distribution of observed amplitudes of a composite uniformity parameter.

Referring now to FIG. 8, a schematic overview of example system components for implementing the above-described methods is illustrated. An example tire 700 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 602a, 602b, ..., 602n in FIG. 8 and combine to form example tire 600. It should be appreciated that a batch of multiple tires can be constructed from one iteration of the various processes 602a through 602n.

Referring still to FIG. 8, a measurement machine 604 is provided to obtain the uniformity measurements of the tire 600. The uniformity measurement machine 604 can be configured to measure uniformity parameters such as radial force variation, lateral force variation, tangential force variation, radial run out, lateral run out, and other uniformity parameters of the tire 600. The uniformity measurement machine 604 can also include a road wheel used to load the tire to obtain force measurements as the tire 600 is rotated.

The measurements obtained by measurement machine 604 can be relayed such that they are received at one or more computing devices 606, which may respectively contain one or more processors 608, although only one computer and processor are shown in FIG. 8 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices, either sequentially or in parallel.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 8 can be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in one or more of the memory elements 612a, 612b, and 612c to cause the processor to perform operations. The operations can include identifying one or more characteristics of a composite uniformity parameter from harmonic magnitudes according to example aspects of the present disclosure disclosed herein.

Example Results

A set of uniformity data including harmonic magnitudes for a plurality of different harmonics for a set of tires was accessed and used to determine a composite Weibull distribution for the set of tires. The composite Weibull distribution was determined by fitting a Weibull distribution to a sum of Weibull distributions associated with each harmonic. The composite Weibull distribution was estimated to have a shape parameter of 1.95 and a scale parameter of 5.6.

The composite Weibull distribution was used to determine a distribution of amplitudes for the composite uniformity parameter for the set of tires. FIG. 7 depicts the distribution of amplitudes 700 determined based at least in part on a composite Weibull distribution according to example aspects of the present disclosure. FIG. 7 plots magnitude along the abscissa and frequency of occurrence along the ordinate.

FIG. 8 depicts an observed distribution of amplitudes 710 of the composite uniformity parameter for the set of tires. FIG. 8 plots observed magnitude along the abscissa and frequency of occurrence along the ordinate. Notice that the distribution of amplitudes 700 determined according to example aspects of the present disclosure shown in FIG. 7 provides a good approximation of the observed distribution of magnitudes 710 shown in FIG. 8.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of improving the uniformity of a tire, comprising:
   obtaining, by one or more computing devices, uniformity data associated with a set of a plurality of tires, the uniformity data comprising one or more sets of harmonic magnitudes for one or more selected harmonics of a uniformity parameter for the set of tires;
   identifying, by the one or more computing devices, one or more parameters of a Weibull distribution for each of the one or more sets of harmonic magnitudes;
   identifying, by the one or more computing devices, one or more characteristics of the composite uniformity parameter for the set of tires based at least in part on the one or more parameters of the Weibull distribution for each of the one or more sets of harmonic magnitudes; and
   modifying tire manufacture based at least in part on the one or more characteristics of the composite uniformity parameter.

2. The method of claim 1, wherein the one or more characteristics of the composite uniformity parameter comprise a range associated with the composite uniformity parameter for the set of tires.

3. The method of claim 2, wherein the range is estimated based at least in part on a scale parameter of a Weibull distribution associated with a set of harmonic magnitudes for a first harmonic of the uniformity parameter for the set of tires and a geometric progression parameter, the geometric progression parameter associated with the progression of scale parameters for Weibull distributions associated with a plurality of different harmonics of the uniformity parameter.

4. The method of claim 1, wherein identifying, by the one or more computing devices, one or more characteristics of the composite uniformity parameter comprises
   estimating, by the one or more computing devices, one or more parameters of a composite Weibull distribution for the set of tires based at least in part on the uniformity data; and
   determining, by the one or more computing devices, the one or more characteristics of the composite uniformity parameter for the set of tires based at least in part on the composite Weibull distribution.

5. The method of claim 4, wherein the uniformity data comprises a first set of harmonic magnitudes for a first selected harmonic of the uniformity parameter and a second set of harmonic magnitudes for a second selected harmonic of the uniformity parameter, the first set of harmonic magnitudes being associated with a first Weibull distribution and the second set of harmonic magnitude being associated with a second Weibull distribution.

6. The method of claim 5, wherein the one or more parameters of the composite Weibull distribution are determined by summing the first Weibull distribution and the second Weibull distributions to generate a sum of Weibull distributions.

7. The method of claim 6, wherein the one or more parameters of the composite Weibull distribution are identified by fitting the composite Weibull distribution to the sum of Weibull distributions.

8. The method of claim 4, wherein the one or more characteristics of the composite uniformity parameter comprise a distribution of amplitudes of the composite uniformity parameter for the set of tires.

9. The method of claim 8, wherein the distribution of amplitudes of the composite uniformity parameter is determined numerically using a distribution function based at least in part on the one or more parameters of the composite Weibull distribution.

10. The method of claim 1, wherein modifying tire manufacture comprises sorting or grading tires based at least in part on the one or more characteristics of the composite uniformity parameter.

11. The method of claim 8, wherein modifying tire manufacture comprises:
    predicting a uniformity yield based at least in part on the distribution of amplitudes; and
    modifying tire manufacture based at least in part on the uniformity yield.

12. The method of claim 11, wherein modifying tire manufacture based at least in part on the uniformity yield comprises adjusting a sorting threshold for the uniformity parameter based at least in part on the uniformity yield.

13. The method of claim 1, wherein modifying tire manufacture comprises rotating one or more tires relative to one or more process elements used in tire manufacture based at least in part on the one or more characteristics of the composite uniformity parameter.

14. The method of claim 1, wherein the uniformity parameter comprises one or more of low and high speed radial force variation, tangential force variation, radial run out, lateral run out, mass variance, conicity, and ply steer.

* * * * *